(12) United States Patent
Gottschalk et al.

(10) Patent No.: US 10,477,873 B2
(45) Date of Patent: Nov. 19, 2019

(54) DEVICE AND METHOD FOR REMOVAL OF PINBONES FROM A FISH FILLET

(71) Applicant: NORDISCHER MASCHINENBAU RUD. BAADER GMBH + CO. KG, Lubeck (DE)

(72) Inventors: Roman Ludwig Gottschalk, Lubeck (DE); Torsten Rusko, Herrnburg (DE)

(73) Assignee: Nordischer Maschinebau Rud. Baader GMBH + Co. KG, Lubeck (DE)

( * ) Notice: Subject to any disclaimer, the term of this patent is extended or adjusted under 35 U.S.C. 154(b) by 0 days.

(21) Appl. No.: 15/745,403

(22) PCT Filed: May 2, 2016

(86) PCT No.: PCT/EP2016/059777
§ 371 (c)(1),
(2) Date: Jan. 16, 2018

(87) PCT Pub. No.: WO2017/008931
PCT Pub. Date: Jan. 19, 2017

(65) Prior Publication Data
US 2018/0206511 A1   Jul. 26, 2018

(30) Foreign Application Priority Data

Jul. 15, 2015 (DE) .................. 10 2015 111 448

(51) Int. Cl.
*A22C 25/00* (2006.01)
*A22C 25/16* (2006.01)
(Continued)

(52) U.S. Cl.
CPC ............ *A22C 25/166* (2013.01); *A22C 25/08* (2013.01); *B25J 9/04* (2013.01); *B25J 11/0045* (2013.01); *Y10S 901/09* (2013.01)

(58) Field of Classification Search
CPC ........ A22C 25/06; A22C 25/08; A22C 25/166
See application file for complete search history.

(56) References Cited

U.S. PATENT DOCUMENTS 5,324,228 A * 6/1994 Vogeley, Jr. ....... A22C 17/0086
452/150
6,123,614 A    9/2000 Kozycki
(Continued)

FOREIGN PATENT DOCUMENTS

CL    19990331        7/1999
CL    200501091       2/2006
(Continued)

OTHER PUBLICATIONS

International Search Report dated Jul. 6, 2016 from International Patent Application No. PCT/EP2016/059777 filed May 2, 2016.
(Continued)

*Primary Examiner* — Richard T Price, Jr.
(74) *Attorney, Agent, or Firm* — David B. Tingey; Bryant J. Keller; Kirton McConkie (57) ABSTRACT

The invention relates to an apparatus, designed and configured for the removal of pin bones from a fish fillet that has been completely separated from the skeleton, comprising a tool having a clamping mechanism for clamping and releasing individual pin bones, a drive for the rotary driving of at least parts of the clamping mechanism and means for transmitting the rotational movement from the drive to the clamping mechanism, which is characterized in that the clamping mechanism comprises a base body that can be driven such that it rotates about a rotational axis, with which at least two clamping jaws are associated, which clamping jaws define a resulting central axis M and are for clamping and releasing the pin bones, wherein the clamping jaws are designed and configured such that they can move towards and away from one another, and the drive is designed and
(Continued)

configured for exerting an oscillating rotational movement of the base body about the rotational axis and thereby of the clamping jaws about the central axis M. The invention further relates to a corresponding method.

16 Claims, 4 Drawing Sheets

(51) Int. Cl.
*A22C 25/08* (2006.01)
*B25J 9/04* (2006.01)
*B25J 11/00* (2006.01)

(56) References Cited

U.S. PATENT DOCUMENTS

| | | | |
|---|---|---|---|
| 6,371,717 B1 * | 4/2002 | Grams | B25J 15/0052 294/81.61 |
| 6,604,991 B1 * | 8/2003 | Jurs | B26D 5/00 452/150 |
| 7,247,086 B2 | 7/2007 | Schneidedr | |
| 7,404,759 B2 * | 7/2008 | Sato | A22B 5/0041 452/157 |
| 7,717,255 B2 * | 5/2010 | Scott | B66C 3/20 198/468.2 |
| 7,857,686 B2 * | 12/2010 | Arnason | A22C 25/166 452/161 |
| 8,092,283 B2 * | 1/2012 | Hansen | A22C 25/08 452/121 |
| 8,585,474 B1 * | 11/2013 | Graham | A22C 25/14 452/161 |
| 8,968,059 B2 * | 3/2015 | Grimm | A22C 25/18 452/156 |
| 9,004,988 B2 * | 4/2015 | Van Der Steen | A22B 5/007 452/125 |
| 9,091,673 B2 * | 7/2015 | Fern | A22B 5/0041 |
| 9,609,882 B2 | 4/2017 | Soderlind et al. | |
| 9,770,039 B2 | 9/2017 | Koljonen | |
| 2007/0185595 A1 * | 8/2007 | Ruden | B25J 9/1692 700/58 |
| 2009/0087830 A1 * | 4/2009 | Oostman, Jr. | A61B 17/00 435/4 |

FOREIGN PATENT DOCUMENTS

| | | |
|---|---|---|
| GB | 1 200 084 A | 7/1970 |
| WO | 93/13672 A1 | 7/1993 |

OTHER PUBLICATIONS

International Preliminary Report on Patentability dated Jan. 16, 2018 from International Patent Application No. PCT/EP2016/059777 filed May 2, 2016.

* cited by examiner

DEVICE AND METHOD FOR REMOVAL OF PINBONES FROM A FISH FILLET

CROSS REFERENCE TO RELATED APPLICATION(S)

This application is a U.S. National Stage Entry of International Patent Application No. PCT/EP2016/059777, filed May 2, 2016, which claims the benefit of German Patent Application No. 102015111448.8, filed Jul. 15, 2015, the disclosures of which are hereby incorporated entirely herein by reference.

BACKGROUND

Technical Field

The invention relates to an apparatus, designed and configured for the removal of pin bones from a fish fillet that has been completely separated from the skeleton, comprising a tool having a clamping mechanism for clamping and releasing individual pin bones, a drive for the rotary driving of at least parts of the clamping mechanism and means for transmitting the rotational movement from the drive to the clamping mechanism.

The invention also relates to a method for the removal of pin bones from a fish fillet that has been completely separated from the skeleton, comprising the steps: clamping the pin bones by a tool having a clamping mechanism, detaching the pin bones by the clamping mechanism, in that at least parts of the clamping mechanism are under the action of a drive, and completely removing the pin bones by extracting said pin bones in their direction of growth by the clamping mechanism.

State of the Art

Such apparatuses and methods are used in the fish processing industry when filleting fish, particularly of the "Salmonidae" species, to remove the ventral bones, the so-called pin bones, which extend on both sides from the spine or the upper ray bones into the fillets, from the fillet. When filleting the slaughtered fish, preferably with opened abdominal cavities, the fish fillets are first completely separated from the skeleton. In the process, the pin bones in the region of the spine or upper ray bones are separated therefrom so that these pin bones remain in the separated fish fillet. These fish fillets obtained during filleting are then usually further processed manually or mechanically with the skin down such that, depending on the freshness of the fish, the pin bones with their separated ends either protrude slightly upwards out of the meat or are located in the region of the surface of the fish fillet on the side directed away from the skin. These free ends of the separated pin bones are referred to in the following as pin bone roots. Starting from their pin bone roots, the pin bones protrude into the fillet in the direction of the skin. At the same time, the pin bones are embedded in the fillet meat and are adhered to it, e.g. via tissue, cartilage or the like.

To remove the pin bones from the fish fillets, these adhesions/connections must be detached so that the pin bones can be pulled out after loosening in their direction of growth. The fresher the fish fillet, the more firmly the pin bones are adhered to the structure of the meat. In practice, different systems are used to extract the ventral bones, that is the pin bones, out of the fillet. U.S. Pat. No. 7,247,086 B2 describes an apparatus and a method for the removal of pin bones having the features of the preamble of claim 1 or claim 12. The clamping mechanism for clamping and releasing the pin bones is formed by a roller and a counter-surface. By rotating the roller, which has a textured surface, by a torque generator as the drive, the pin bones are clamped between the roller which only rotates in one direction and the counter-surface. As soon as the pin bones have been clamped between the roller and the counter-surface, the roller is stopped. To detach the pin bones which are now clamped, the clamping mechanism is set in vibration by a vibration generator. When the clamped pin bones are detached, rotation of the roller resumes in the same direction in order to thus pull the pin bones out of the fillet.

The known systems have the disadvantage that on the one hand they are structurally complex and on the other hand they are limited with respect to the success of boning. In other words, the known systems sometimes lead on the one hand to the pin bones being broken during clamping such that bone remnants remain in the fillet. On the other hand, the pin bones cannot be reliably detached and therefore removed.

Thus the object of the invention is to create a simple and compact apparatus which reliably extracts the pin bones from the fillet.

SUMMARY

This object is achieved by an apparatus having the features referred to hereinbefore in that the clamping mechanism comprises a base body that can be driven such that it rotates about a rotational axis D, with which at least two clamping jaws are associated, which clamping jaws define a resulting central axis M and are for clamping and releasing the pin bones, wherein the clamping jaws are designed and configured such that they can move towards and away from one another, and the drive is designed and configured for exerting an oscillating rotational movement of the base body about the rotational axis D and thereby of the clamping jaws about the central axis M. On the one hand, the design according to the invention enables gentle or load-reducing clamping of the pin bones. On the other hand, the oscillating rotational movement of the whole clamping mechanism, that is of the base body and the clamping jaws about the rotational axis D or central axis M, enables safe and nevertheless gentle or load-reducing detachment of the pin bones, particularly from fresh fish fillets. Due to the oscillating rotational movement, that is the rotation of the tool backwards and forwards about the rotational axis D or central axis M at an angle preferably less than +/−360° around a zero position, the pin bones are reliably detached from the structure of the meat and the existing connections with the fillet such that they can be pulled out of the fillet.

Preferably, the rotational axis D of the base body and the resulting central axis M of the clamping jaws are oriented in the same direction and aligned with one another. Thus the clamping jaws or their common central axis M as well as the rotational axis D of the base body are oriented with the pin bones substantially in alignment with the central axis of the pin bones to be removed, at least in the region of the ends directed towards the clamping jaws, that is in the region of the pin bone roots. Essentially, in this context it means that the tool with its opened clamping jaws can attach almost vertically onto the upstanding pin bones. The tool thus enables targeted clamping of the pin bones which increases the success of boning.

A preferred embodiment of the apparatus is characterised in that the drive is an electric motor by which the oscillating rotational movement is executable about an angle preferably greater than +/−60° around a zero position and especially preferably about an angle +/−180° around the zero position. Starting from an arbitrarily defined zero position, which is defined, for example, by the position determined on attaching the clamping mechanism, in the intended operating mode the clamping mechanism with the clamped pin bones can be moved alternately about an angle α in the one direction and about an angle β in the other direction, etc. The angles α and β can in this case be the same size or different sizes and preferably be a size of greater than 1° and less than 360°. A particularly effective detaching operation to facilitate extraction of the pin bones is achieved with an angle size of 180°, starting each time from the zero position in both directions.

Expediently, the apparatus comprises a control unit by which the frequency and the amplitude of the oscillating rotational movement are controllable around the zero position. As a result, the oscillating rotational motion can be adjusted individually for each fish fillet, e.g. depending on the size of the pin bones, the consistency of the fish fillets, etc., that is in respect of the amplitude, i.e. the size of the angle, and/or the frequency, i.e. the rate of occurrence of the rotations alternating in respect of the direction of rotation, and optionally also in respect of intensity.

An advantageous development is characterised in that it is designed and configured for automatic removal of the pin bones from fish fillets and comprises a transport element for feeding and discharging the fish fillets to be processed, means for recording product-specific data, an evaluation unit for determining the exact position of the pin bones to be removed in each fish fillet as well as a control unit for controlling the tool dependent on the recorded and determined data and information. Due to this embodiment, a particularly efficient apparatus is created which additionally makes the success of boning independent of an operator.

Advantageously, the tool or the base body, with the clamping jaws arranged thereon, is configured to be movable in at least two degrees of freedom in addition to the oscillating rotational movement, namely, on the one hand, vertically to the transport plane E spanned by the transport element and, on the other hand, transversely to the transport direction T of the transport element. Thus an optimised positioning of the clamping mechanism in respect of the position of the pin bones can be achieved such that clamping and pulling of the pin bones in their direction of growth to prevent breakage of the pin bones is ensured.

A preferred embodiment is characterised in that the tool or the base body with the clamping jaws arranged thereon is designed and configured to be freely movable in space. Thus, the positioning of the clamping mechanism can be even further improved, as a result of which the success of boning is further improved. Furthermore, this embodiment also allows the tool to run with the fish fillet to be processed, as a result of which, on the one hand, the relative speed between the tool and the fish fillet can be reduced or prevented completely and, on the other hand, the performance of the apparatus can be increased.

Expediently, the tool is arranged on a robot arm by which the tool or the base body, with the clamping jaws arranged thereon, is designed to be movable in three linear directions x, y, z and pivotable about at least two pivot axes $S_1$ and $S_2$. This ensures a particularly flexible use of the clamping mechanism.

An advantageous development is characterised in that the means for recording the product-specific data, namely for identifying the position of the fish fillet on the transport element and/or for identifying the size and/or texture of the fish fillet comprises at least one camera and/or at least one x-ray apparatus. By this embodiment, the tool can be controlled correspondingly precisely with detailed knowledge of the pin bone position which contributes to improving the success of boning.

Advantageously, the drive for the transport element, the means for recording the product-specific data, the evaluation unit for determining the exact position of the pin bones to be removed and the tool for removing the pin bones with its drives are connected to a common control unit. In other embodiments, there may be a plurality of separate control units for the different components which are then operatively connected to each other. However, a compact and easy to handle apparatus is created due to the common control unit.

In an especially preferred embodiment, the apparatus is an integral part of an automatic fish processing line. As a result, the pin bones can be removed virtually online during the actual filleting process which guarantees performance-enhanced and quality-enhanced fish processing.

The object is also achieved by a method having the steps referred to hereinbefore in that the clamping mechanism for detaching the pin bones, formed from a base body and at least two clamping jaws associated with said base body, is rotatingly driven by the drive about a rotational axis D for exerting an oscillating rotational movement. Oscillating rotational movement is defined as a rotation in which the tool is rotated about its rotational axis/central axis alternately in both directions of rotation, in such a manner that a reciprocating movement is achieved around a zero position.

Advantageously, the clamping mechanism with its at least two clamping jaws for clamping the pin bones, which define a resulting central axis M, is attached to said pin bones in such a manner that the central axis M, which is oriented in the same direction and aligned with the rotational axis D, is oriented substantially in alignment with the central axis of the pin bones to be removed, at least in the region of the ends of the pin bones directed towards the clamping jaws.

An especially preferred embodiment of the method is characterised in that removing the pin bones takes place automatically, in such a manner that the fish fillets are fed in and discharged by a transport element, prior to removing the pin bones product-specific data are recorded by a means, these data are evaluated by an evaluation unit to determine the exact position of the pin bones to be removed and the tool is controlled by a control unit dependent on the recorded and determined data and information.

Advantageously, the tool or the base body, with the clamping jaws arranged thereon, in addition to the oscillating rotational movement is automatically moved by the control unit in at least two degrees of freedom based on the recorded and determined data and information for clamping the pin bones, for extracting the pin bones and for releasing the pin bones.

A preferred development provides that the oscillating rotational movement of the clamping mechanism is controlled in respect of the frequency and amplitude. The amplitude corresponds to the angle of rotation with which the base body with the clamping jaws arranged thereon is rotated around the zero position, e.g. starting from a zero position +180° in one direction and exceeding the zero position −180° in the other direction, that is a reciprocation about 180° around the zero position. The frequency describes the rate of occurrence per unit of time of this reciprocating movement around the zero position.

The advantages arising from this have already been described in connection with the apparatus, which is why reference will be made to the relevant passages to avoid repetitions.

BRIEF DESCRIPTION OF THE DRAWINGS

Further expedient and/or advantageous features and developments of the apparatus according to the invention as well as preferred method steps of the method according to the invention emerge from the dependent claims and the description. An especially preferred embodiment of the invention is explained in greater detail with reference to the attached drawing. The drawing shows:

DETAILED DESCRIPTION OF THE DRAWINGS

The apparatus illustrated in the drawing is used for removing pin bones from a salmon fillet. Of course, the apparatus according to the invention is also suitable for removing any other type of pin bones from fillets of different species of fish.

Figure 1:
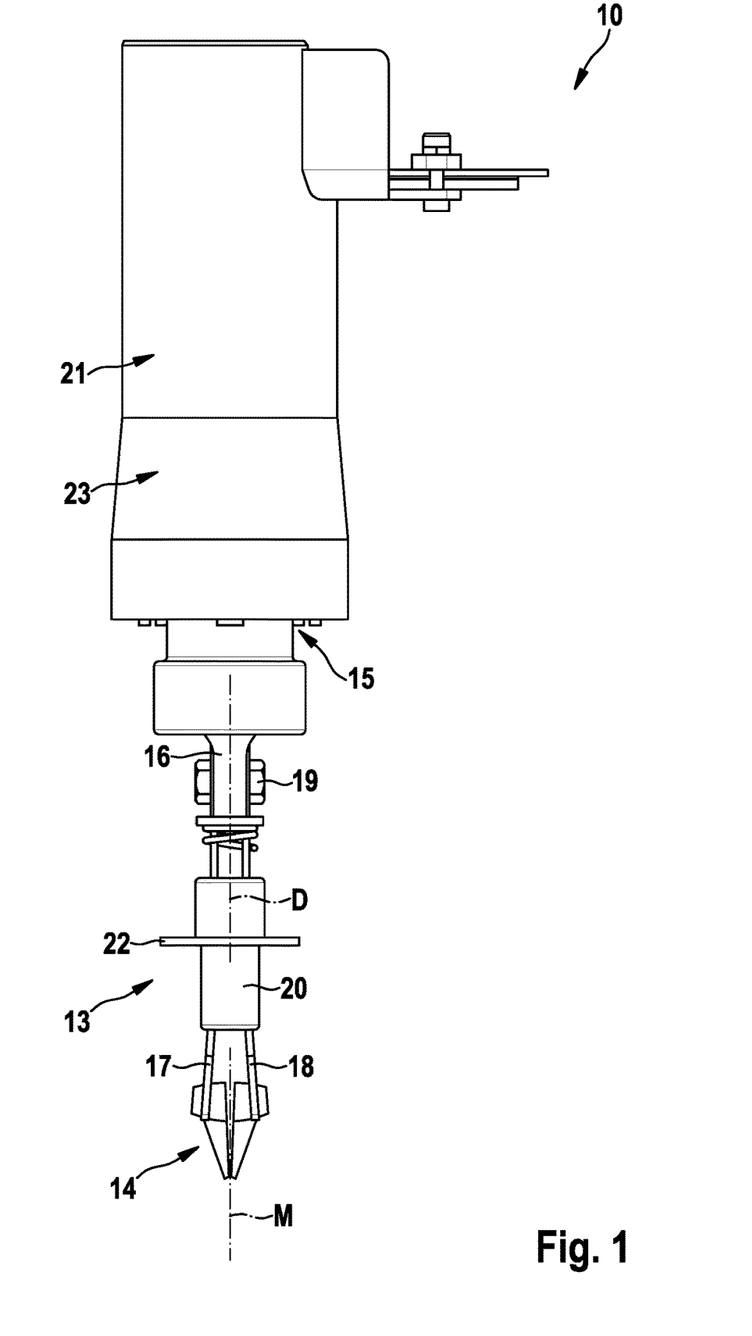
FIG. 1 a schematic representation of a first embodiment of the apparatus according to the invention in front view, FIG. 2 a perspective view of the apparatus according to FIG. 1, FIG. 3 a schematic representation of a further embodiment of the apparatus according to the invention in front view, FIG. 4 a schematic representation of a further embodiment of the apparatus according to the invention in front view, and FIG. 5 the representation in the view V-V according to FIG. 4.
Figure 2:
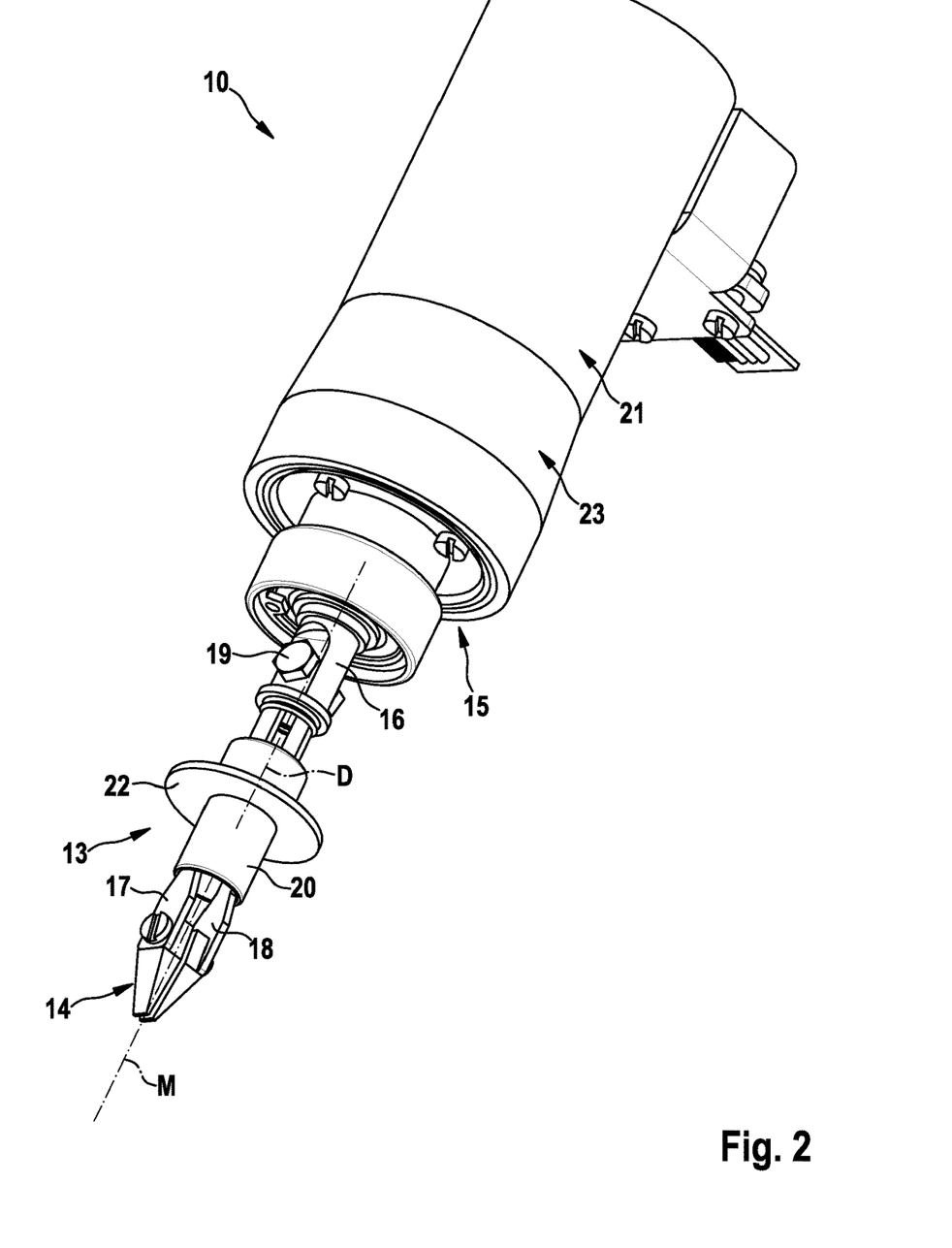
Figure 3:
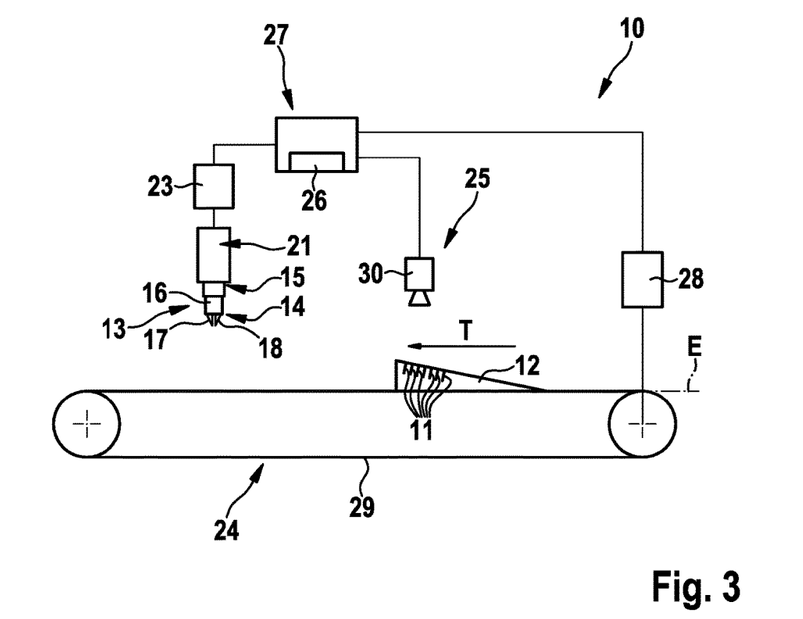
Figure 4:
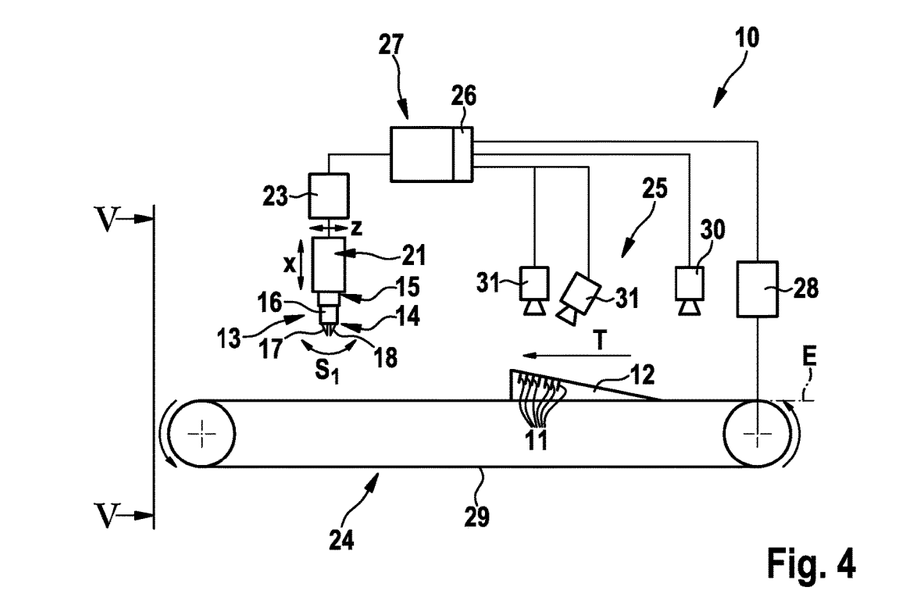
Figure 5:
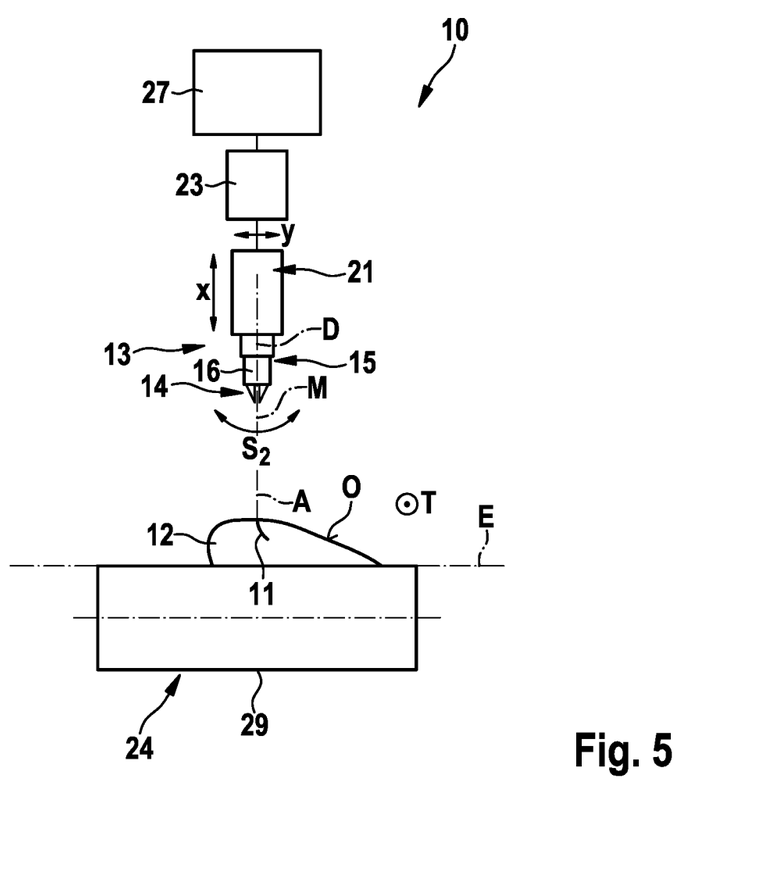

FIG. 1 shows an apparatus 10 which is designed and configured for the removal of pin bones 11 from a fish fillet 12 which has been completely separated from the skeleton, said pin bones 11 and separated fish fillet 12 being shown in FIGS. 3-5 and further referenced hereinafter. The apparatus 10 comprises a tool 13 having a clamping mechanism 14 for clamping and releasing individual pin bones 11, a drive 15 for the rotary driving of at least parts of the clamping mechanism 14 and means such as a connected base body 16 and tow clamping jaws 17, 18 for transmitting the rotational movement from the drive 15 to the camping mechanism 14.

This apparatus 10 is characterised according to the invention in that the clamping mechanism 14 comprises a base body 16 that can be driven such that it rotates about a rotational axis D, with which at least two clamping jaws 17, 18 are associated, which clamping jaws define a resulting central axis M and are for clamping and releasing the pin bones 11, wherein the clamping jaws 17, 18 are designed and configured such that they can move towards and away from one another, and the drive 15 is designed and configured for exerting an oscillating rotational movement of the base body 16 about the rotational axis D and thereby of the clamping jaws 17, 18 about the central axis M.

When taken on their own or in combination with each other, the features and developments described below illustrate preferred embodiments. It is expressly pointed out that features which are summarised in the claims and/or the description or are described in a common embodiment can also further develop the apparatus 10 described above in a functionally independent manner. The same applies to the method described below.

As mentioned, the clamping jaws 17, 18 are associated with the base body 16. Thus, the rotational movement of the base body 16 can be transferred to the clamping jaws 17, 18. In other words, the clamping jaws 17, 18 are arranged in a torsionally fixed manner relative to the base body 16. The two or more clamping jaws 17, 18 form a unit whose common, namely resulting, central axis M extends centrally. The base body 16 can be a drive element of the drive 15, that is a component of the drive 15, or an element separate from the drive 15. The clamping jaws 17, 18 associated with the base body 16 can be formed integrally with the base body 16 or can be releasably attached to the base body 16 together or individually.

The clamping jaws 17, 18 can be formed as simple, prestressed spring plates. In the embodiments shown, two clamping jaws 17, 18 are provided which form a type of tweezers arrangement. The two clamping jaws 17, 18, which are releasably attached to the base body 16 by screws 19 in the example shown, are held in a closing or clamping position by a sleeve element 20. By linearly moving the sleeve element 20, for example by a pneumatic cylinder or similar, upwards away from the free ends of the clamping jaws 17, 18, the spring plates can relax and move out of the clamping position away from each other into an open receiving position. By moving the sleeve element 20 downwards in the direction of the free ends, the clamping position is reached again due to moving towards each other. However, other embodiments of the clamping jaws 17, 18, for example as a pneumatically driven chuck or similar, are also possible. The number of clamping jaws 17, 18 can also vary.

The apparatus 10 according to the invention is also suitable among other things as a hand-held device which is guided by an operator. For this the apparatus 10 can comprise a shank 21 which serves as a handle and in the case of the apparatus 10 being integrated in an automatic filleting machine can also serve as a holder. The drive 15 for rotary driving of the clamping mechanism 14 and the means for transmitting the rotational movement from the drive 15 to the clamping mechanism 14 are preferably arranged inside the shank 21. In the event that the apparatus 10 is used as a hand-held device, actuating means are provided on the shank 21 for the drive 15. The hand-held device can be used battery-powered. The sleeve element 20 has a collar-shaped actuating element 22 or similar for actuating the clamping mechanism 14.

The rotational axis D of the base body 16 and the resulting central axis M of the clamping jaws 17, 18 are oriented in the same direction and aligned with one another in the embodiment shown. In intended use, that is when a pin bone 11 is clamped by the clamping mechanism 14, this axial alignment forms the extension of the central axis A of a pin bone 11 so that a purely rotational movement in the form of the oscillating rotational movement can be exerted on the pin bone 11 about its central axis A.

Especially preferably, an electric motor is provided as drive 15 by which the oscillating rotational movement can be executed particularly precisely. The frequency and amplitude of the oscillating rotational movement can be set and changed quickly and easily with the electric motor. The amplitude describes the size of angle about which the clamping mechanism 14 is rotated backwards and forwards around a zero position. Preferably, the angle is +/−60° around the zero position and especially preferably around an angle +/−180°. This means that the clamping mechanism 14 is first rotated, starting from the zero position, by +180° in one direction to subsequently rotate by 360° in the other direction, equivalent to starting from the zero position, by −180° in the other, opposing direction. The size of the amplitude and frequency with which the forwards and backwards movement is executed is controllable by a control unit 23.

Especially preferably, the apparatus 10 is designed and configured for automatic removal of the pin bones 11 from fish fillets 12, that is it part of an automated filleting machine and in particular an integral part of an automatic fish processing line. For this, the apparatus 10 comprises a transport element 24 for feeding and discharging the fish fillets to be processed, means 25 for recording product-specific data, an evaluation unit 26 for determining the exact position of the pin bones 11 to be removed in each fish fillet 12 as well as a control unit 27 for controlling the tool 13 dependent on the recorded data and information. Examples of such an arrangement can be gathered in particular from FIGS. 3 and 4.

The transport element 24 is, for example, a conveyor belt 29 rotationally driven by a drive 28. However, other conveying means can also be used. The means 25 for recording product-specific data is arranged upstream of the tool 13 in transport direction T. The means 25 can comprise, for example, a camera 30 as in FIG. 3. In FIG. 4, in addition to a camera 30, the means 25 also comprises two x-ray apparatuses 31. However, the number and selection of the means 25 is variable. On the one hand, the position of the fish fillets 12 on the transport element 24 and/or on the other hand the size and/or texture of the fish fillets 12 can be identified with the means 25. In other words, the means 25 is designed and configured to gather and save all information regarding the fish fillet 12 which is important in connection with the removal of the pin bones 11, such as geometric data on the fish fillet 12, namely size, external contour, surface contour and position of the pin bones 11 in the fish fillet 12 and position of the fish fillet 12 on the transport element 24, or data on the texture/consistency of the fish fillet 12. The evaluation unit 26 can be an integral part of the means 25 or the control unit 27. The drive 28 for the transport element 24, the means 25 for recording the product-specific data, the evaluation unit 26 for determining the exact position of the pin bones 11 to be removed and the tool 13 for removing the pin bones 11 with its illustrated drive 15 as well as all other drives for moving the tool 13 which are not explicitly illustrated and the control unit 23 are connected to the control unit 27. The control unit 23, however, can also be an integral part of the higher level control unit 27. The entire apparatus 10 is preferably connected to a central power supply.

The tool 13 or the base body 16 with the clamping jaws 17, 18 arranged thereon is configured to be movable in at least two degrees of freedom in addition to the oscillating rotational movement. In order to position the tool 13 optimally depending on the position of the fish fillet 12 on the transport element 24 and the position of the pin bones 11 in the fish fillet 12 which are to be removed, the tool 13 is movable on the transport element 24 on the one hand vertically (see x direction in FIGS. 4 and 5) to the transport plane E spanned by the transport element 24, and on the other hand transversely to the transport direction T (see y direction in FIG. 5) of the fish fillet 12. Optionally, the tool can also be movable in a further direction, namely parallel to the transport direction T (see z direction in FIG. 4). Thus the tool 13 can then also be actuated during processing concurrently with the fish fillet 12. An embodiment of the tool 13 in which the tool 13 or the base body 16, with the clamping jaws 17, 18 arranged thereon, is designed and configured to be freely movable in space is particularly advantageous if the tool 13 can thus be moved to any spatial position of the fish fillet 12.

Linear drives, for example, can be provided to move the tool 13 along the said (x, y, x direction). Especially preferably, the tool 13 is arranged on a robot arm (not explicitly illustrated) or similar. By the robot arm, the tool 13 arranged on the free end thereof or the base body 16, with the clamping jaws 17, 18 arranged thereon, can be moved in at least three linear directions, namely in x, y and z direction and is configured to be pivotable about at least two pivot axes $S_1$ and $S_2$. The pivot axis $S_1$ (indicated in FIG. 4) relates to pivoting in the transport direction T. The pivot axis $S_2$ (indicated in FIG. 5) relates to pivoting transverse to the transport direction T. The pivot axes $S_1$ and $S_2$ are used in particular to bring the tool 13 into an optimal clamping position in which the rotational axis D of the base body 16 and correspondingly the central axis M of the clamping jaws 17, 18 is oriented substantially in alignment with the central axis A of the pin bones 11. The variations in position and alignment of the pin bones 11 can be compensated with these movement options because, as a natural product, the fish fillets 12 have different growth directions and orientations of the pin bones 11.

The method for the removal of pin bones 11 from a fish fillet 12 that has been completely separated from the skeleton is explained in detail below based on the associated drawing:

First the pin bones 11 are clamped by a tool 13 having a clamping mechanism 14. When the pin bone 11 is securely clamped, is detached by the clamping mechanism 14 in that at least parts of the clamping mechanism 14 are under the action of a drive 15. When the pin bone 11 is sufficiently detached, it is removed completely from the fish fillet 12 in that the pin bone 11 is pulled out in its direction of growth by the clamping mechanism 14.

According to the invention, the clamping mechanism 14 for detaching the pin bones 11, which is formed from a base body 16 and at least two clamping jaws 17, 18 associated with said base body 16, is rotatingly driven by the drive 15 about a rotational axis D for exerting an oscillating rotational movement. This means that every clamped pin bone 11 is rotated backwards and forwards around a zero position until it is sufficiently detached for it to be pulled out of the fish fillet 12.

For clamping the pin bones 11, the clamping mechanism 14 with its at least two clamping jaws 17, 18, which define a resulting central axis M, is attached to said pin bones 11 from above in such a manner that the central axis M of the clamping jaws 17, 18, which is oriented in the same direction and in alignment with the rotational axis D of the base body 16, is oriented substantially in alignment with the central axis A of the pin bones 11 to be removed, at least in the region of the ends of the pin bones 11 directed towards the clamping jaws 17, 18. Such an (idealised) state is illustrated in FIG. 5. Since the free ends of the pin bones 11, which are located in the region of the upper side of the fish fillet 12 directed towards the tool 13 or stick up out of said fish fillet, can assume different positions/situations/orientations due to the fact that this is a natural product, on the one hand a "substantially" aligned orientation is deemed as sufficient, since an ideal aligned orientation cannot always be maintained, and on the other hand the position of the tool 13 is readjusted relative to the pin bone 11 to achieve the optimum position.

In the automatic version of the method, the fish fillets 12 are initially transported into the region of the tool 13 by the transport element 24. On the transport path to the tool 13, the individual fish fillets 12 are detected and/or recorded and/or scanned by a means 25 in order to record product-specific data. These data are evaluated by an evaluation unit 26 and made available to a control unit 27. To move the tool 13 to the desired position, the tool 13 or the base body 16, with the clamping jaws 17, 18 arranged thereon, in addition to the oscillating rotational movement is automatically moved by the control unit 27 in at least two degrees of freedom based on the recorded data and information for clamping the pin bones 11, for extracting the pin bones 11 and for releasing the pin bones 11. The tool 13 is preferably moved automatically along the x, y and z direction as well as about the pivot axes $S_1$ and $S_2$.

The control unit 27 controls the tool 13 (in y and z direction as well as about the pivot axes $S_1$ and $S_2$) to the correct position above the pin bones 11 to be removed, lowers the tool 13 (in x direction) so that the tool 13 can grip or clamp the pin bones 11, initiates the oscillating rotational movement of the clamping mechanism 14 until the pin bone 11 is detached, and raises the tool 13 again (in x direction) in order to pull the pin bone 11 out of the fish fillet 12 in the direction of growth. The pin bone 11 which is still clamped can then be dropped at a suitable location to clear the clamping mechanism 14 for the next process. The frequency and amplitude of the oscillating rotational movement of the clamping mechanism 14 are controlled by the control unit 23 and/or the control unit 27.

When clamping the pin bones 11, the drive 15 is in the "off mode", that is it is stopped. After gripping, the drive is switched into the "on mode" so that the clamping mechanism 14 performs an oscillating rotational movement. When the pin bone 11 is detached, it is pulled out by the clamping mechanism 14 which can be stopped or oscillating rotationally during the process.

The invention claimed is:

1. An apparatus, designed and configured for the removal of pin bones from a fish fillet that has been completely separated from the skeleton, comprising a tool having a clamping mechanism for clamping and releasing individual pin bones, a drive for the rotary driving of at least parts of the clamping mechanism and means for transmitting the rotational movement from the drive to the clamping mechanism, characterised in that the clamping mechanism comprises a base body that can be driven such that it rotates about a rotational axis, with which at least two clamping jaws are associated, which clamping jaws define a resulting central axis M and are for clamping and releasing the pin bones, wherein the clamping jaws are designed and configured such that they can move towards and away from one another, and the drive is designed and configured for exerting an oscillating rotational movement of the base body about the rotational axis and thereby of the clamping jaws about the central axis M.

2. The apparatus according to claim 1, characterised in that the rotational axis D of the base body and the resulting central axis M of the clamping jaws are oriented in the same direction and aligned with one another.

3. The apparatus according to claim 1, characterised in that the drive is an electric motor by which the oscillating rotational movement is executable about an angle preferably greater than +/−60° around a zero position and especially preferably about an angle +/−180° around the zero position.

4. The apparatus according to claim 1, further comprising a control unit by which frequency and amplitude of oscillating rotational movement are controllable around zero position.

5. The apparatus according to claim 1, characterised in that the apparatus is designed and configured for automatic removal of the pin bones from fish fillets and comprises a transport element for feeding and discharging the fish fillets to be processed, means for recording product-specific data, an evaluation unit for determining the exact position of the pin bones to be removed in each fish fillet as well as a control unit for controlling the tool dependent on the recorded and determined data and information.

6. The apparatus according to claim 5, characterised in that the tool or the base body, with the clamping jaws arranged thereon, is configured to be movable in at least two degrees of freedom in addition to oscillating rotational movement, and vertically to the transport plane E spanned by the transport element and, on the other hand, transversely to the transport direction T of the transport element.

7. The apparatus according to claim 5, characterised in that the means for recording the product-specific data, namely for identifying the position of the fish fillet on the transport element and/or for identifying the size and/or texture of the fish fillet comprises at least one camera and/or at least one x-ray apparatus.

8. The apparatus according to claim 5, characterised in that the drive for the transport element, the means for recording the product-specific data, the evaluation unit for determining the exact position of the pin bones to be removed and the tool for removing the pin bones with its drives are connected to a common control unit.

9. The apparatus according to claim 1, characterised in that the tool or the base body, with the clamping jaws arranged thereon, is designed and configured to be freely movable in space.

10. The apparatus according to claim 1, characterised in that the tool is arranged on a robot arm by which the tool or the base body, with the clamping jaws arranged thereon, is designed to be movable in three linear directions x, y, z and pivotable about at least two pivot axes $S_1$ and $S_2$.

11. The apparatus according to claim 1, characterised in that the apparatus is an integral part of an automatic fish processing line.

12. A method for the removal of pin bones from a fish fillet that has been completely separated from the skeleton, comprising the steps:
Clamping the pin bones by a tool having a clamping mechanism,
Detaching the pin bones by the clamping mechanism in that at least parts of the clamping mechanism are under the action of a drive, and
Completely removing the pin bones by extracting said pin bones in the direction of growth of the bones by the clamping mechanism,
characterised in that the clamping mechanism for detaching the pin bones, which clamping mechanism is formed from a base body and at least two clamping jaws associated with said base body, is rotatingly driven by the drive about a rotational axis D for exerting an oscillating rotational movement.

13. The method according to claim 12, characterised in that the clamping mechanism with its at least two clamping jaws for clamping the pin bones, which define a resulting central axis M, is attached to said pin bones in such a manner that the central axis M, which is oriented in the same direction and aligned with the rotational axis D, is oriented substantially in alignment with the central axis A of the pin bones to be removed, at least in the region of ends of the pin bones directed towards the clamping jaws.

14. The method according to claim 12, characterised in that removing the pin bones takes place automatically, in such a manner that the fish fillets are fed in and discharged by a transport element, prior to removing the pin bones product-specific data are recorded, these data are evaluated by an evaluation unit to determine the exact position of the pin bones to be removed and the tool is controlled by a control unit dependent on the recorded and determined data and information.

15. The method according to claim 14, characterised in that the tool or the base body, with the clamping jaws arranged thereon, in addition to the oscillating rotational movement is automatically moved by the control unit in at least two degrees of freedom based on the recorded and determined data and information for clamping the pin bones, for extracting the pin bones and for releasing the pin bones.

16. The method according to claim 12, characterised in that the oscillating rotational movement of the clamping mechanism is controlled in respect of frequency and amplitude.

\* \* \* \* \*